(12) United States Patent
de Goycoechea

(10) Patent No.: US 11,799,501 B2
(45) Date of Patent: Oct. 24, 2023

(54) COVERAGE EXTENSION ANTENNA SYSTEM

(71) Applicant: Fiplex Communications, Inc., Doral, FL (US)

(72) Inventor: Ricardo Matias de Goycoechea, Cordoba (AR)

(73) Assignee: FIPLEX COMMUNICATIONS, INC., Miami, FL (US)

( * ) Notice: Subject to any disclaimer, the term of this patent is extended or adjusted under 35 U.S.C. 154(b) by 0 days.

(21) Appl. No.: 17/324,744

(22) Filed: May 19, 2021

(65) Prior Publication Data

US 2021/0367625 A1 Nov. 25, 2021

Related U.S. Application Data

(60) Provisional application No. 63/027,100, filed on May 19, 2020.

(51) Int. Cl.
*H04B 1/00* (2006.01)
*H04B 7/155* (2006.01)

(52) U.S. Cl.
CPC ....... *H04B 1/0028* (2013.01); *H04B 7/15507* (2013.01)

(58) Field of Classification Search
CPC ........... H04W 88/085; H04W 72/0453; H04W 40/02; H04W 72/0413; H04W 24/02; H04W 72/042; H04W 72/0486; H04W 16/26; H04W 4/029; H04W 72/02; H04W 72/1263; H04W 40/20; H04W 40/22; H04W 24/10; H04W 4/025; H04W 64/00; H04W 4/023; H04W 16/24; H04W 88/08; H04W 64/003; H04W 64/006; H04W 84/08; H04W 88/02; H04W 92/02; H04W 24/08; H04W 56/001; H04W 72/082; H04W 72/12; H04W 16/04; H04W 16/10; H04W 16/14; H04W 28/0205; H04W 28/22; H04W 4/33; H04W 40/06; H04W 40/12; H04W 72/005; H04W 84/047; H04W 88/00; H04B 10/25753; H04B 10/25752; H04B 7/15507; H04B 10/2575; H04B 10/27; H04B 7/022; H04B 7/024; H04B 7/026; H04B 7/04; H04B 1/001; H04B 17/27; H04B 17/336; H04B 7/155; H04B 10/25751; H04B 7/1555; H04B 7/2606; H04B 17/318; H04B 17/345; H04B 3/54; H04B 7/15542; H04B 17/21; H04B 17/29; H04B 3/36; H04B 3/52; H04B 7/0413; H04B 7/0691; H04B 7/08; H04B 7/15528; H04B 1/38; H04B 1/40; H04B 1/7163; H04B 2203/544
See application file for complete search history.

(56) References Cited

U.S. PATENT DOCUMENTS 8,755,469 B1 * 6/2014 Su .................. H04L 27/0006
375/342
2015/0229386 A1 * 8/2015 Lange ................ H04B 7/15507
370/317

* cited by examiner

*Primary Examiner* — Golam Sorowar
(74) *Attorney, Agent, or Firm* — Rafael Perez-Pineiro; The Brickell IP Group, PLLC

(57) ABSTRACT

A coverage extension antenna system includes a signal booster or a DAS. The signal booster or DAS includes a set of demodulators that convert incoming signals to baseband, and includes a set of modulators that modulate the baseband signals before transmitting the modulated signals to a base station or terminal equipment.

16 Claims, 24 Drawing Sheets

COVERAGE EXTENSION ANTENNA SYSTEM

CROSS REFERENCE TO RELATED APPLICATIONS

This application claims the benefit of U.S. Provisional Application No. 63/027,100 filed May 19, 2020, the disclosure of which is hereby incorporated herein by reference in its entirety.

FIELD OF THE DISCLOSURE

This disclosure relates generally to antenna systems for distributing signals in a communications network.

BACKGROUND

Public safety agencies and first responders utilize radio communication systems in order to exchange information in real time, coordinate tasks of different operating groups, allow the agencies to attend to and deal with emergency situations, coordinate their personnel in the field, and collaborate in orderly fashion with other public safety agencies.

Radio communication systems operate in different frequency bands, typically in VHF (136-174 MHz), UHF (380-520 MHz) or in the upper 700 MHz and 800 MHz bands (758-869 MHz), among other bands. In these frequency bands, the radiofrequency signals that are used by the radio communication systems have a good propagation in open space, but face propagation obstacles when penetrating walls and roofs to reach inside closed places such as commercial buildings, shopping malls, schools, subway stations, stadiums, etc. When passing through physical barriers such as walls and roofs, radiofrequency signals are attenuated, meaning that they lose strength, and typically that attenuation makes the radiofrequency signal not strong enough to provide a reliable radio communication service. As a consequence, the public safety agents and first responders may be disconnected from the radio communication system. Poor signal quality in closed spaces, thus, jeopardizes the public safety agents and first responders from accomplishing their tasks.

Existing solutions have proven inadequate to solve these signal coverage problems. Most of these solutions are based on installing systems that receive signals from distant signal sources, or base stations, then amplify the base station's signals and retransmit them throughout the interior of a building to terminal equipment within, such as radios or phones. These solutions are based on the use of a signal booster or bidirectional amplifier that bi-directionally amplifies the signals from the base station to the terminal equipment, and vice versa. In the downlink direction, meaning the direction in which signals are sent from the base station to terminal equipment, signals from the base station are received by a donor antenna that points to the base station. The downlink signals are then amplified, and the downlink signals are distributed throughout the interior of the closed environment through a passive radio frequency distribution network and indoor antennas. In the uplink direction, which is the opposite direction to the downlink direction, the signals transmitted by the terminal equipment are captured by the indoor antennas, are transmitted to the signal booster through a passive radio frequency distribution network, and then amplified and radiated to the base station by means of the donor antenna.

When the closed area subject to coverage is exceptionally large, then instead of using a signal booster, a system using multiple amplifier elements known in the industry as Distributed Antenna System, or Fiber DAS, may be used. A Fiber DAS can cover larger areas through use of more antennas. However, these also have drawbacks. Usually, a signal booster or a Fiber DAS system includes high gain amplifiers that amplify signals in the same frequency, which presents problems that includes the raising of the noise floor in the uplink band, which is the band of terminal equipment communication to the base station. This elevation of the noise floor hinders the base station's ability to listen to the radio signals emitted by the terminal equipment that are in the border of the coverage area of the network itself, causing a "slight deafness" effect, which drastically reduces the size to the operational area of the base station.

Therefore, in view of these disadvantages, there is a need in the art for an improved coverage extension antenna system.

SUMMARY

The following presents a simplified summary of the invention in order to provide a basic understanding of some aspects of the invention. This summary is not an extensive overview of the invention. Rather than specifically identifying key or critical elements of the invention or to delineate the scope of the invention, its purpose, inter alia, is to present some concepts of the invention in a simplified form as a prelude to the more detailed description that is presented later.

The present disclosure relates to a coverage extension antenna system that includes a signal booster or a DAS. The signal booster or DAS includes a set of demodulators that convert incoming signals to baseband, and includes a set of modulators that modulate the baseband signals before transmitting the modulated signals to a base station or terminal equipment.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE FIGURES

The drawings, in which like numerals represent similar parts, illustrate generally, by way of example, but not by way of limitation, various embodiments discussed in the present document.

DETAILED DESCRIPTION OF THE DISCLOSURE

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. It should also be understood that the drawings are not necessarily to scale and in certain instances details may have been omitted, which are not necessary for an understanding of the disclosure, such as details of fabrication and assembly. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

Figure 1:
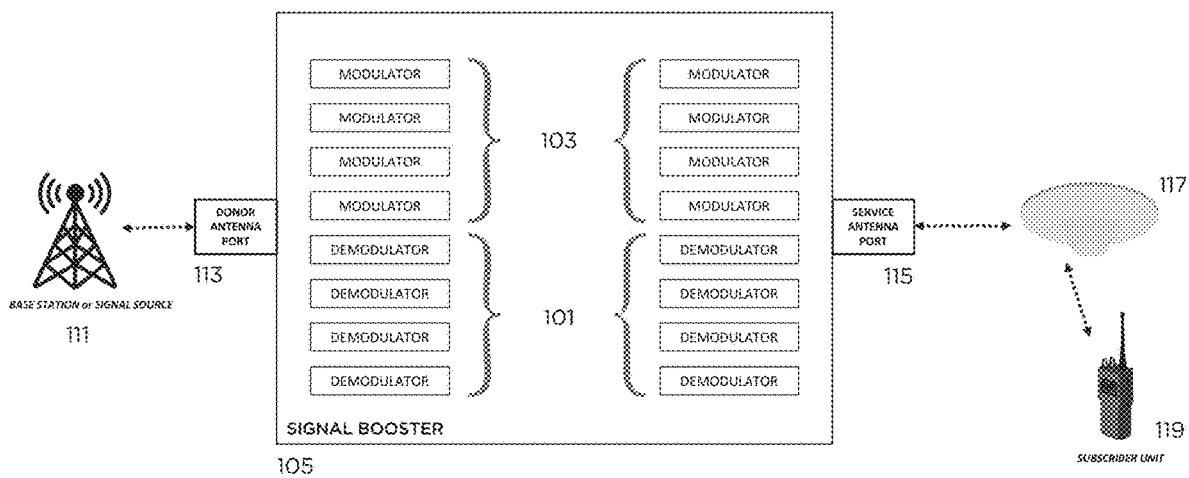
FIG. 1 illustrates an embodiment of an antenna system using a signal booster.

The antenna system 100 of FIG. 1 may include a base station or signal source 111, transmits and receives signals to and from a donor antenna connected to donor antenna port 113 of a signal booster 105. The signal booster 105 includes a service antenna port 115 connected to one or more service antennas 117 displaced within a building, for example, that transmit and receive signals to and from terminal equipment such as a subscriber unit 119.

Figure 2:
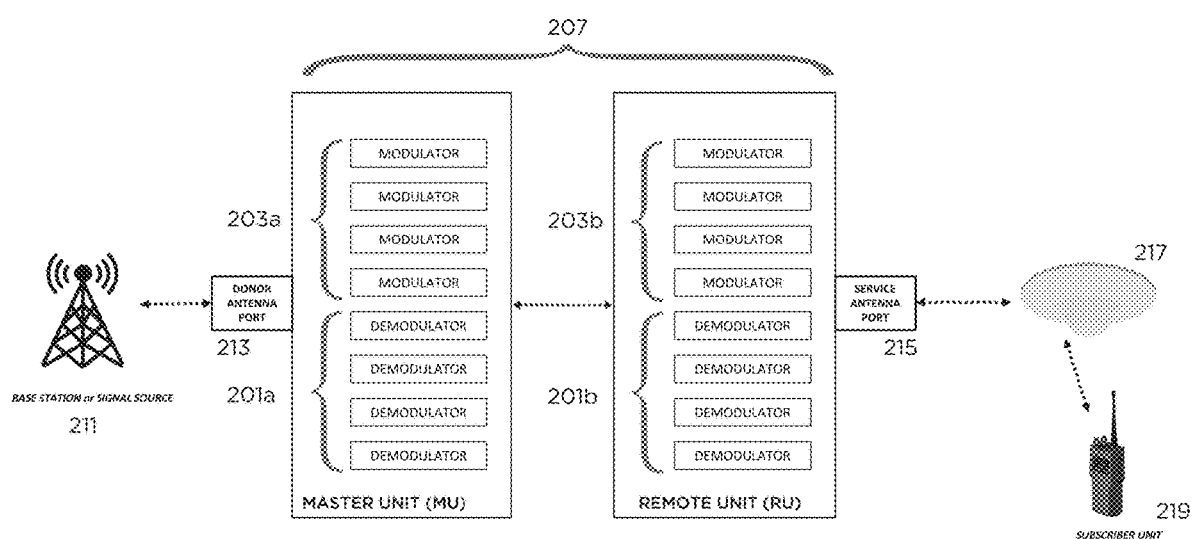
FIG. 2 illustrates an embodiment of an antenna system using a master unit and a remote unit.
Figure 3:
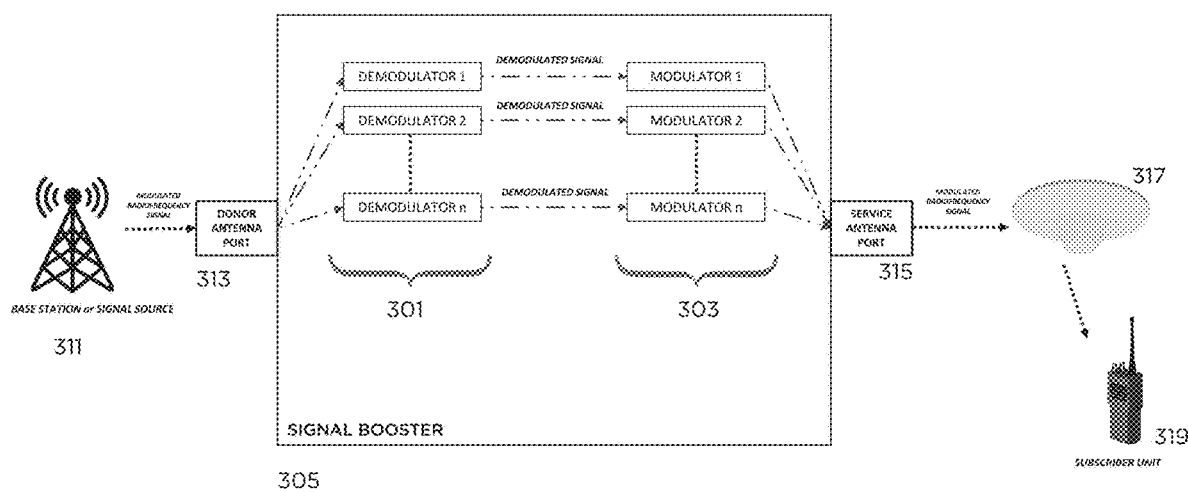
FIG. 3 illustrates downlink signal transmission through an embodiment of a signal booster for use with the antenna system of FIG. 1.
Figure 4:
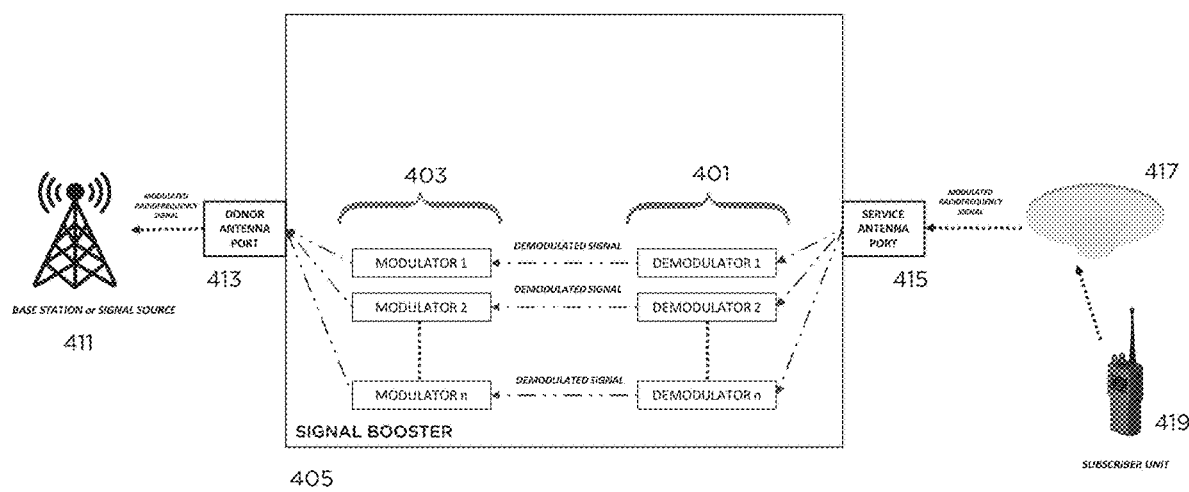
FIG. 4 illustrates uplink signal transmission through the signal booster of the antenna system of FIG. 1.

The antenna system 200 of FIG. 2 may include a base station or signal source 211, transmits and receives signals to and from a donor antenna connected to donor antenna port 213 of a DAS 207. The DAS 207 includes a service antenna port 215 connected to one or more service antennas 217 displaced within a building, for example, that transmit and receive signals to and from terminal equipment such as a subscriber unit 219.

With reference to FIGS. 1 and 2, embodiments of an antenna system 100 (200 in FIG. 2) are disclosed that include the integration of the functionality of one or more demodulators 101 and modulators 103 either within a signal booster 105, such as illustrated in FIG. 1, or within a DAS 207 (whether a fiber DAS or a DAS employing any other connectivity methods), such as illustrated by demodulators 201a-b and modulators 203a-b in FIG. 2.

Referring to FIGS. 3-7, a signal booster or bidirectional amplifier 305 may have one or more first demodulators 301 connected to one or many donor antenna ports 313 (or donor communications interface for wired connection) directed towards one or more radiofrequency signal sources, such as one or more base stations 311. First demodulators 301 may operate to demodulate one or more modulated radio frequency signals sent in a downlink transmission (see FIG. 3, for example) from the one or more base stations 311. One or more first modulators 303 may be connected to one or many service antenna ports 315 (or service communications interface for wired connection) directed towards one or more terminal units or receivers 319. First modulators 303 may operate to generate one or more modulated radiofrequency signals using the demodulated signal(s) or baseband signals from the first demodulators 301 in the downlink transmission.

Conversely, in an uplink transmission (see FIG. 4, for example) one or more second demodulators 401 may be connected to one or many service antenna ports 415 for receiving one or more modulated radiofrequency signal emitted by one or more terminal units 419. Second demodulators 401 may operate to demodulate the one or more radio frequency signals sent in an uplink transmission from the one or more terminal units 419. One or more second modulators 403 may be connected to the one or many donor antenna ports 413. Second modulators 403 may operate to generate or more modulated radiofrequency signals using the demodulated signal(s) or baseband signals from the second demodulators 401 in the uplink transmission.

The modulators and demodulators may be connected to their respective antenna ports or communication interfaces directly or via passive filters. They may also be connected through front-end amplifiers or power amplifiers. The signal booster 105 may have a plurality of donor antenna ports/ donor communication interfaces, service antenna ports/service communication interfaces, or both. Where a signal booster has multiple ports or communication interfaces, the modulators and demodulators may be respectively connected to each port/interface directly or via passive filters, as well as through front-end amplifiers or power amplifiers. Modulators and demodulators may also be embedded in a digital signal process (DSP) module or field programmable gate array (FPGA) module.

Figure 5:
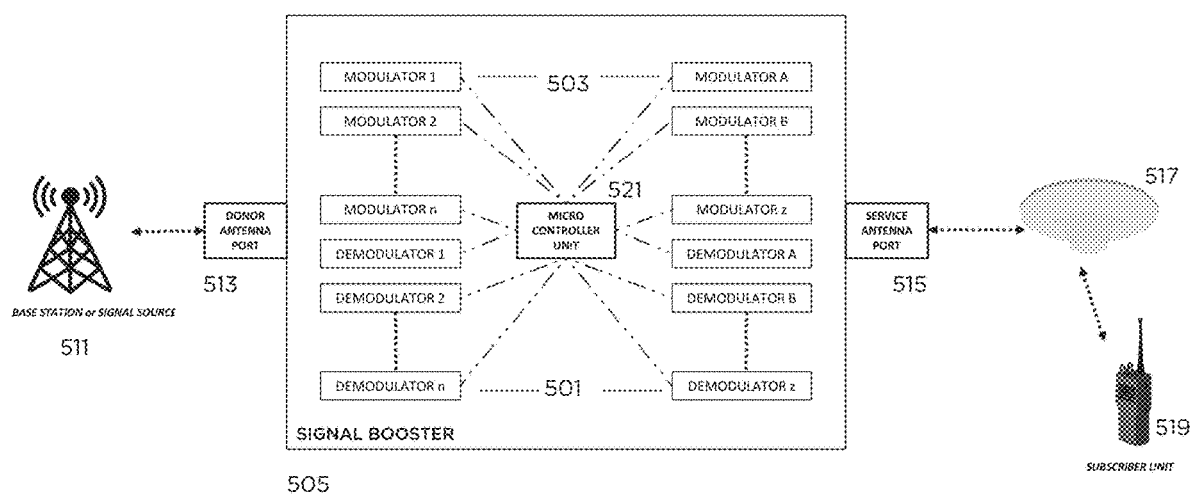
FIG. 5 illustrates bidirectional signal transmission through an embodiment of a signal booster for use with the antenna system of FIG. 1.

FIG. 5 shows an embodiment where the modulators 503 and demodulators 501 are mutually connected to a centralized micro controller unit 521 within the signal booster. The micro controller 521 is illustrated as a single device, but it should be appreciated that a combination of two or more controller units may operate as a centralized micro controller. In some embodiments, the modulators 503 and demodulators 501 may be implemented as distinct and independent circuitry.

Figure 6:
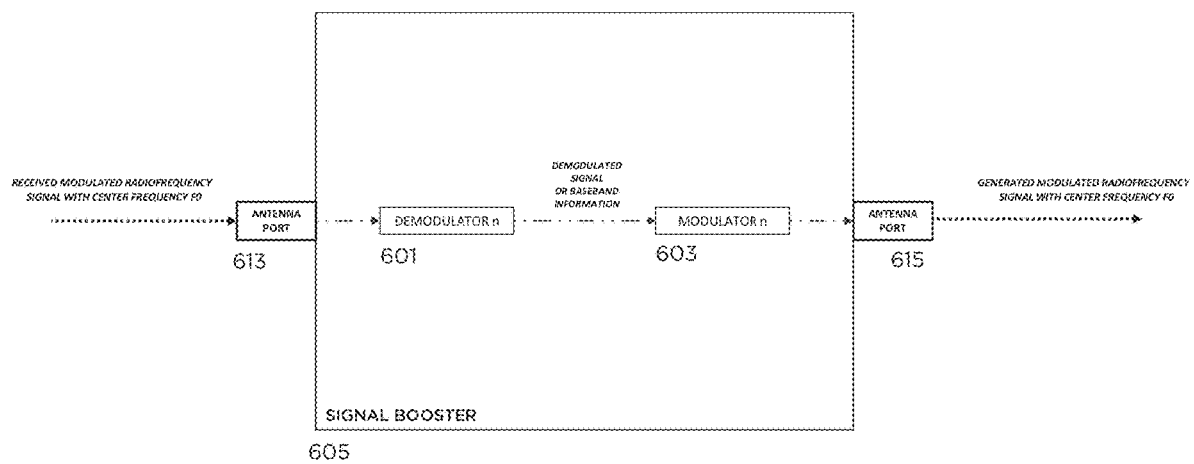
FIG. 6 illustrates signal transmission through an embodiment of a signal booster for use with the antenna system of FIG. 1, where the modulated frequency of the signal exiting the signal booster has the same center frequency as the demodulated signal entering the signal booster.
Figure 7:
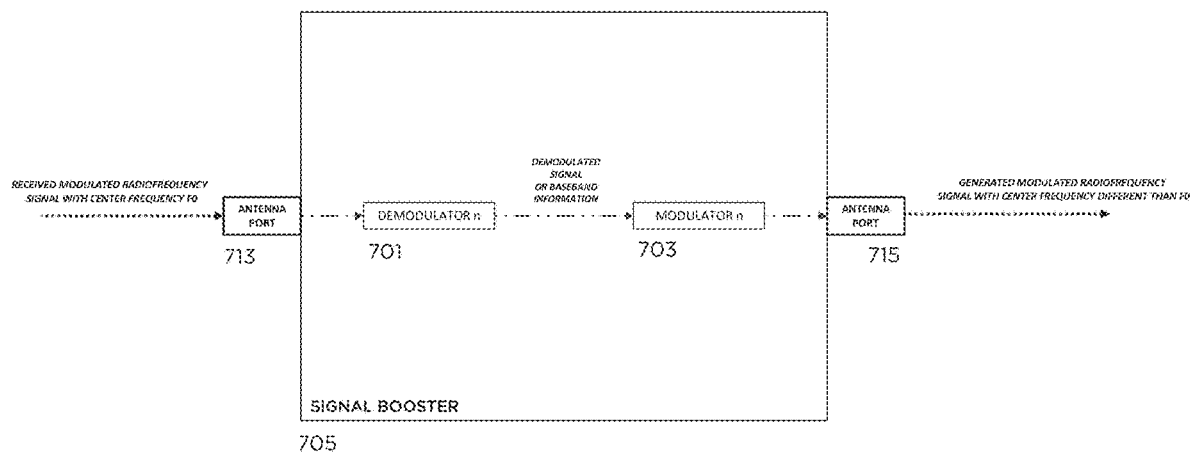
FIG. 7 illustrates signal transmission through an embodiment of a signal booster for use with the antenna system of FIG. 1, where the modulated frequency of the signal exiting the signal booster has a different center frequency as the demodulated signal entering the signal booster.
Figure 8:
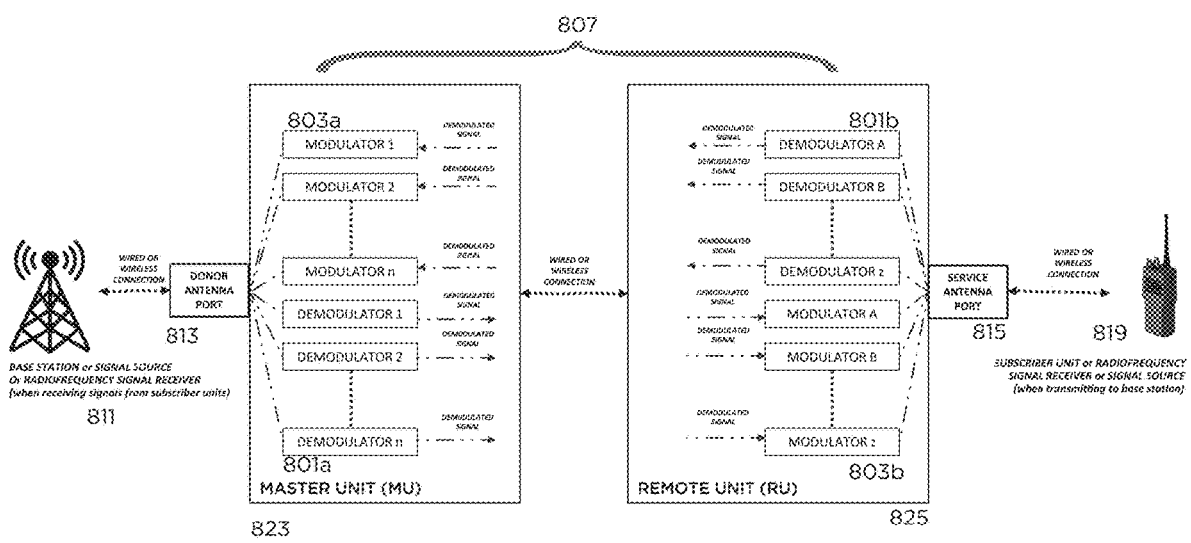
FIG. 8 illustrates embodiments of a master unit and a remote unit for use with the antenna system of FIG. 2.

Each modulator may have an associated demodulator and vice versa. As such, each demodulator may receive a modulated radiofrequency signal and may demodulate it, recovering the baseband signal or information, and the associated or paired modulator may generate a modulated radiofrequency signal using the baseband information delivered by its associated demodulator to generate a modulated radio frequency. The newly generated modulated radio frequency may have the same center or carrier frequency as the original center or carrier frequency of the signal that was demodulated (as shown in FIG. 6) or may have a center or carrier frequency different from the original center or carrier frequency of the signal that was demodulated (as shown in FIG. 7).

Referring to FIG. 5, for incoming signals received by the signal booster 505, the micro controller 521 in one embodiment first ascertains the modulation scheme and center frequency for each incoming signal on a per channel basis. This may be accomplished by relying on information previously provided by the system operator. In an alternative embodiment, the modulation scheme of incoming signals may be ascertained by an automatic modulation classifier implemented by the controller 521 or by separate circuitry (e.g., FPGA) in communication with the micro controller.

Once the modulation scheme of the incoming signal is determined, the micro controller 521 may communicate with a demodulator from a first set of demodulators and instruct that demodulator to apply the proper demodulation scheme to demodulate the incoming signal, converting the incoming signal to a baseband signal, for example. In one embodiment, the first set of demodulators may be implemented through use of a single chip.

Once the incoming signal is demodulated and converted to a baseband signal, the micro controller may communicate with a modulator from a first set of modulators and instruct that modulator to apply the same modulation scheme of the original incoming signal to modulate the baseband signal. In one embodiment, the first set of demodulators may be implemented through use of a single chip.

Optionally, once the incoming signal is converted to a baseband signal, the baseband signal may be processed through use of digital signal processing techniques to clean the signal prior to modulating the baseband signal. The digital signal processing may be implemented by the micro controller of by a separate DSP chip in communication with the micro controller.

For some implementations, given the computing power required to implement the demodulation and modulation of incoming signals, more than one micro controller may be required. The one or more microcontrollers in a signal booster may receive instructions from the system operator (not illustrated) to control the operation of the demodulators and modulators. The system operator may be defined as a person that is able to program or configure the microcontroller(s) through an interface such as USB, Ethernet connection, etc. The system operator may also be defined as the core of one or more base transceiver stations that instruct the microcontroller how to configure the demodulators and modulators, for example.

The instructions from the system operator may include an indication of the channel in which each demodulator and modulator should tune in, an indication of which modulation scheme should be implemented by each modulator and which demodulation scheme should be implemented by each demodulator, and instructions for how to route baseband information from the demodulators to the modulators (a demodulator to modulator routing scheme).

Referring to FIG. 5, the signal booster 505 may be operated through the microcontroller(s) 521 by implementing a number of flexible configurations. In a first exemplary configuration, an incoming signal that is FSK modulated is received on a 100 MHz channel by DEMODULATOR 1 (which is tuned in to the 100 MHz channel), DEMODULATOR 1 demodulates the incoming signal to recover the baseband signal or information, the microcontroller routes the baseband signal or information to MODULATOR A, MODULATOR A modulates the baseband signal or information by applying an FSK modulation scheme before transmission of the FSK modulated signal on the 100 MHz channel. In this configuration, a second incoming signal that is FM modulated is received on a 101 MHz channel by DEMODULATOR 2 (which is tuned in to the 101 MHz channel), DEMODULATOR 2 demodulates the incoming signal to recover the baseband signal or information, the microcontroller routes the baseband signal or information to MODULATOR B, MODULATOR B modulates the baseband signal or information by applying an FM modulation scheme before transmission of the FM modulated signal on the 101 MHz channel. In this first exemplary configuration, the signals output by the signal booster 505 are the same as the input signals—same channels and same modulation schemes.

In a second exemplary configuration, an incoming signal that is FSK modulated is received on a 100 MHz channel by DEMODULATOR 1 (which is tuned in to the 100 MHz channel), DEMODULATOR 1 demodulates the incoming signal to recover the baseband signal or information, the microcontroller routes the baseband signal or information to MODULATOR A, MODUALOR A modulates the baseband signal or information by applying an C4FM modulation scheme before transmission of the C4FM modulated signal on the 100 MHz channel. In this configuration, a second incoming signal that is FM modulated is received on a 101 MHz channel by DEMODULATOR 2 (which is tuned in to the 101 MHz channel), DEMODULATOR 2 demodulates the incoming signal to recover the baseband signal or information, the microcontroller routes the baseband signal or information to MODULATOR B, MODULATOR B modulates the baseband signal or information by applying an FSK modulation scheme before transmission of the FSK modulated signal on the 101 MHz channel. In this second exemplary configuration, the signals output by the signal booster are the same as the input signals with respect to the channels, but the output signal may have a different modulation scheme than its corresponding incoming signal. Terminal equipment can ascertain which demodulation scheme to use since terminal users, as well as the base stations, are predefined or preconfigured with certain modulation schemes, and based on the control unit and user configuration, the system is able to properly program the Signal Booster and/or DAS to set which modulation and demodulation schemes to use according to each channel and each base station.

For scenarios in which the output signal has either a different center frequency and/or different modulation scheme, the Signal Booster or DAS micro controller unit can modify the base band information so that the terminal unit (in downlink) or the base station (in uplink) can recover the modulated information out of the newly modulated signal. For example, if the incoming signal is FM modulated, the modulating information is voice, by applying a FM demodulation with the same center frequency than the FM modulated signal, then the audio is recovered. In some other scenarios when other modulation techniques are applied, signaling information could be added to the baseband prior to modulation of the baseband information (together with the digital data that constitutes the digitalized information contained in the base band) so that the terminal unit or base station receiver can get that signaling information (contained in headers of the base band frames) in order to, for example, synchronize the recovery of the information contained in the base band frame.

In a third exemplary configuration, an incoming signal that is FSK modulated is received on a 100 MHz channel by DEMODULATOR 1 (which is tuned in to the 100 MHz channel), DEMODULATOR 1 demodulates the incoming signal to recover the baseband signal or information, the microcontroller routes the baseband signal or information to MODULATOR A, MODULATOR A modulates the baseband signal or information by applying an C4FM modulation scheme before transmission of the C4FM modulated signal on a 102 MHz channel. In this configuration, a second incoming signal that is FM modulated is received on a 101 MHz channel by DEMODULATOR 2 (which is tuned in to the 101 MHz channel), DEMODULATOR 2 demodulates the incoming signal to recover the baseband signal or information, the microcontroller routes the baseband signal or information to MODULATOR B, MODULATOR B modulates the baseband signal or information by applying an FSK modulation scheme before transmission of the FSK modulated signal on a 103 MHz channel. In this third exemplary configuration, the signals output by the signal booster are the same as the input signals with respect to the information only, but the output signal may have a different modulation scheme and assigned channel than its corresponding incoming signal. For scenarios in which the output signal has either a different center frequency and/or different modulation scheme, the Signal Booster or DAS micro controller unit can modify the base band information so that the terminal unit (in downlink) or the base station (in uplink) can recover the modulated information out of the newly modulated signal. For example, if the incoming signal is FM modulated, the modulating information is voice, by applying a FM demodulation with the same center frequency than the FM modulated signal, then the audio is recovered. In some other scenarios when other modulation techniques are applied, signaling information could be added to the baseband prior to modulation of the baseband information (together with the digital data that constitutes the digitalized information contained in the base band) so that the terminal unit or base station receiver can get that signaling information (contained in headers of the base band frames) in order to, for example, synchronize the recovery of the information contained in the base band frame.

In a fourth exemplary configuration, an incoming signal that is FSK modulated is received on a 100 MHz channel by DEMODULATOR 1 (which is tuned in to the 100 MHz channel), DEMODULATOR 1 demodulates the incoming signal to recover the baseband signal or information, the microcontroller routes the baseband signal or information to MODULATOR A and MODULATOR B, MODULATOR A modulates the baseband signal or information by applying an C4FM modulation scheme before transmission of the C4FM modulated signal on a 102 MHz channel, and MODULATOR B modulates the baseband signal or information by applying an FSK modulation scheme before transmission of the FSK modulated signal on a 103 MHz channel. In this fourth exemplary configuration, the signals output by the signal booster are the same as the input signal with respect to the information, but the output signals may have a different modulation scheme and assigned channel than its corresponding incoming signal. For scenarios in which the output signal has either a different center frequency and/or different modulation scheme, the Signal Booster or DAS micro controller unit can modify the base band information so that the terminal unit (in downlink) or the base station (in uplink) can recover the modulated information out of the newly modulated signal. For example, if the incoming signal is FM modulated, the modulating information is voice, by applying a FM demodulation with the same center frequency than the FM modulated signal, then the audio is recovered. In some other scenarios when other modulation techniques are applied, signaling information could be added to the baseband prior to modulation of the baseband information (together with the digital data that constitutes the digitalized information contained in the base band) so that the terminal unit or base station receiver can get that signaling information (contained in headers of the base band frames) in order to, for example, synchronize the recovery of the information contained in the base band frame.

In addition to the exemplary configurations, there may be other configurations that may be implemented by the controller based at least on information or instructions provided by the system operator. The choice of modulation scheme may depend on the characteristics of the channel and signal distribution architecture. For example, a modulation scheme which is efficient for transmission of signals over a wired channel may not be an efficient modulation scheme for transmission of signals over a wireless channel. Similarly, a modulation scheme which is efficient for transmission of signals over a wireless line of sight channel may not be an efficient modulation scheme for transmission of signals over a wireless multipath channel. The present invention enables the system operator to configure the system to allow the efficient distribution of signals to and from terminal equipment depending on the characteristics of the channel.

Referring now to FIGS. 8-16, a DAS system may include a master unit (MU) 823 in wired or wireless connection with at least one base station or radiofrequency source 811. The MU 823 may in turn be connected to at least one remote unit (RU) 825 via fiber optic, coax cable, multipair cable or any other wired or wireless connections. The RU 825 may also be connected to one or more terminal units 819 or any other radiofrequency receiver or signal source (when the terminal units transmit signals to the base station, for example).

The MU 823 may have one or more first demodulators 801a connected to at least one donor antenna port 813 or donor communication interface of the MU 823 in order to demodulate one or more modulated radio frequency signals in the downlink transmission from the one or more base stations 811. Conversely, the MU 823 may have one or more second modulators 803a connected to the donor antenna port 813 or donor communication interface in order to generate a modulated signal from a demodulated baseband signal received from the RU 825. The RU 825 may have one or more first modulators 803b connected with the MU 823 as well as a service antenna port 815 (or many ports) or service communication interface of the RU 825. The first modulators 803b of the RU 825 may receive the demodulated signal from the MU 823 and generate a modulated radiofrequency signal to be transmitted to terminal units 819 via the service antenna port 815 or service communication interface in a downlink transmission. As for the uplink transmission, the RU 825 may have one or more second demodulators 801b connected with the service antenna port 815 or service communication interface for receiving and demodulating a modulated uplink signal. The demodulated signal may then be transmitted to the MU 823 and, more specifically, to the one or more second modulators 803a.

Figure 9:
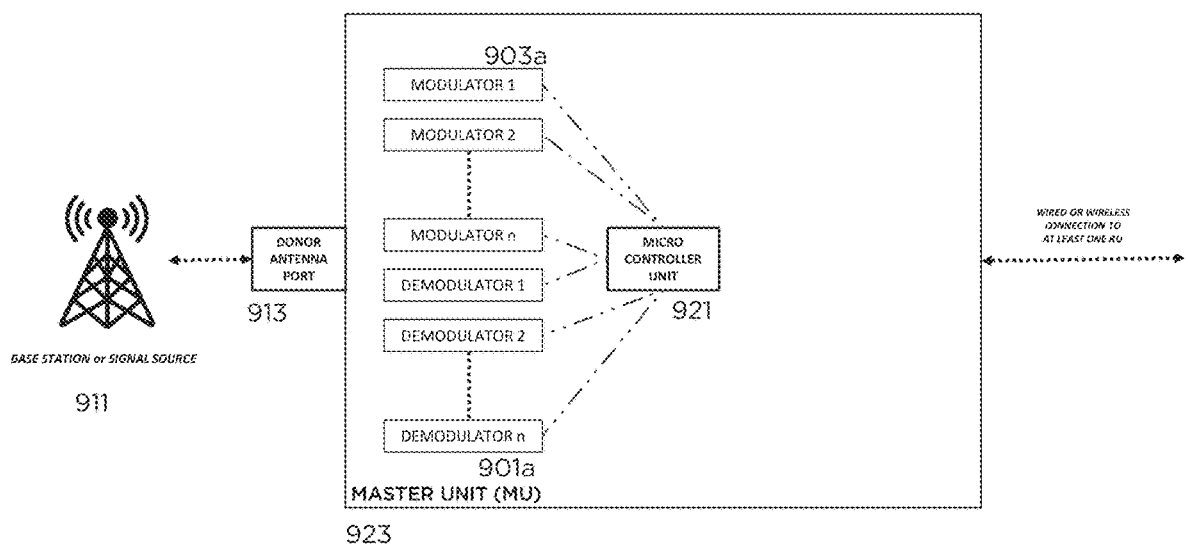
FIG. 9 illustrates an embodiment of a master unit for use with the antenna system of FIG. 2.
Figure 10:
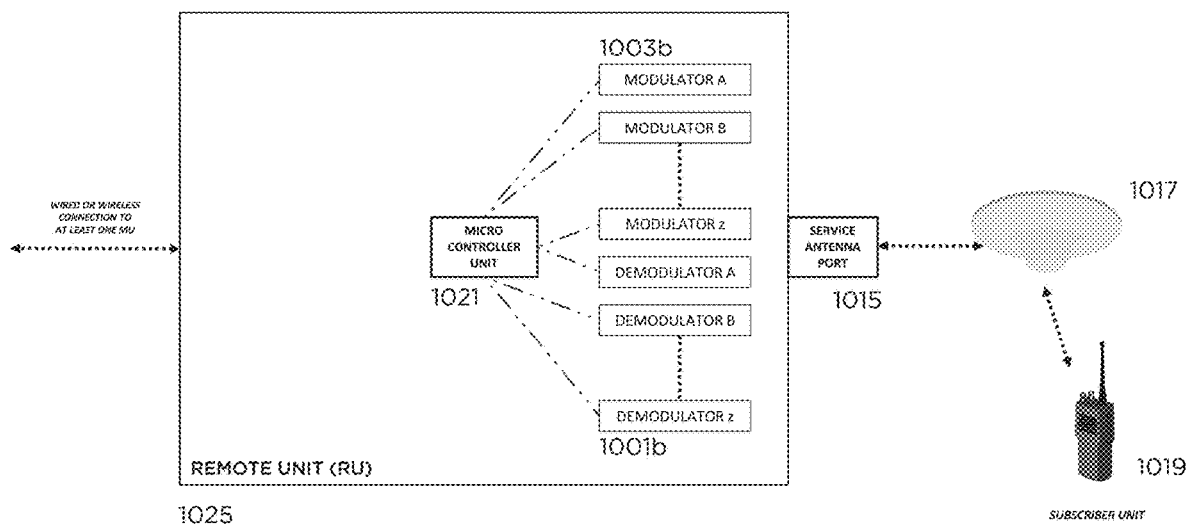
FIG. 10 illustrates an embodiment of a remote unit for use with the antenna system of FIG. 2.

One or more microcontroller units may be utilized with the RU and/or MU. For example, a MU microcontroller 921 may be connected with the first demodulators 901a and the second modulators 903a (as shown in FIG. 9) and a RU microcontroller 1021 may be connected with the first modulators 1003b and the second demodulators 1001b (as shown in FIG. 10). The operation of the microcontrollers in the DAS is similar to the operation of the microcontroller of the signal booster, as explained above.

The various embodiments of modulators and demodulators disclosed herein may be capable of modulating and demodulating radiofrequency signals of APCO P25 Phase 1, APCO P25 phase 2, TETRA, TETRAPOL, DMR, conventional analog modulation, or any other telecommunication system technology known or to be developed. Furthermore, the demodulators may be capable of demodulating a modulated radiofrequency signal of a first telecommunication system technology, and the modulator may be capable of generating a modulated radio frequency signal of a second telecommunication system technology. As such, the modulator may use total or part of the demodulator's demodulated baseband information.

Figure 11:
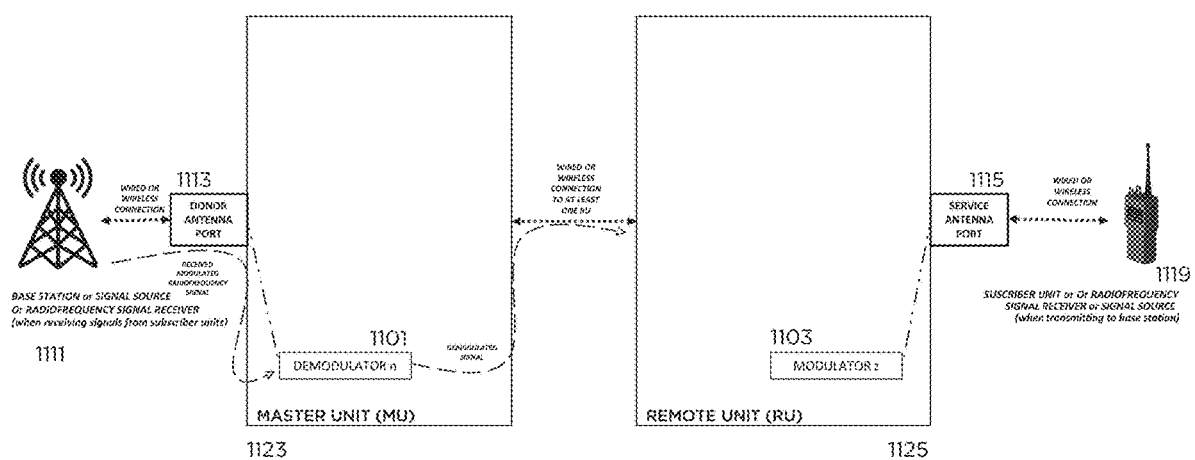
FIG. 11 illustrates downlink signal transmission through an embodiment of the master unit of the antenna system of FIG. 2.

FIG. 11 illustrates downlink signal transmission through an embodiment of the master unit of the antenna system of FIG. 2. The modulated signal received by the donor antenna 1113 is demodulated by demodulator 1101 in MU 1123 and the baseband signal is passed on to the remote unit 1125 through a wired or wireless connection.

Figure 12:
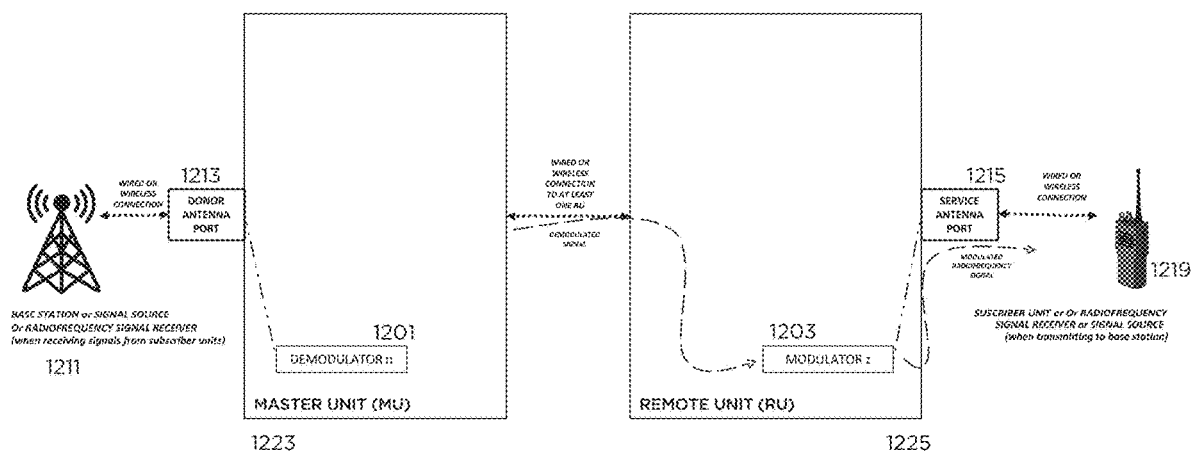
FIG. 12 illustrates downlink signal transmission through an embodiment of the remote unit of the antenna system of FIG. 2.

FIG. 12 illustrates downlink signal transmission through an embodiment of the remote unit of the antenna system of FIG. 2. The baseband signal from demodulator 1201 is modulated by modulator 1203 and passed on to service antenna port 1215 for transmission to the terminal equipment 1219.

Figure 13:
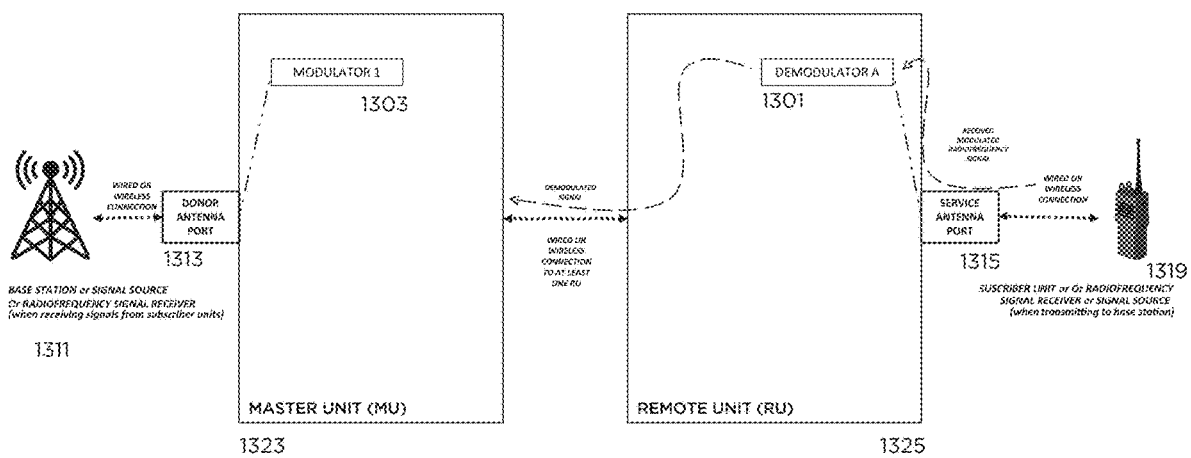
FIG. 13 illustrates uplink signal transmission through an embodiment of the remote unit of the antenna system of FIG. 2.

FIG. 13 illustrates uplink signal transmission through an embodiment of the remote unit of the antenna system of FIG. 2. The modulated signal received by the service antenna 1315 is demodulated by demodulator 1301 in RU 1125 and the baseband signal is passed on to the MU 1323 through a wired or wireless connection.

Figure 14:
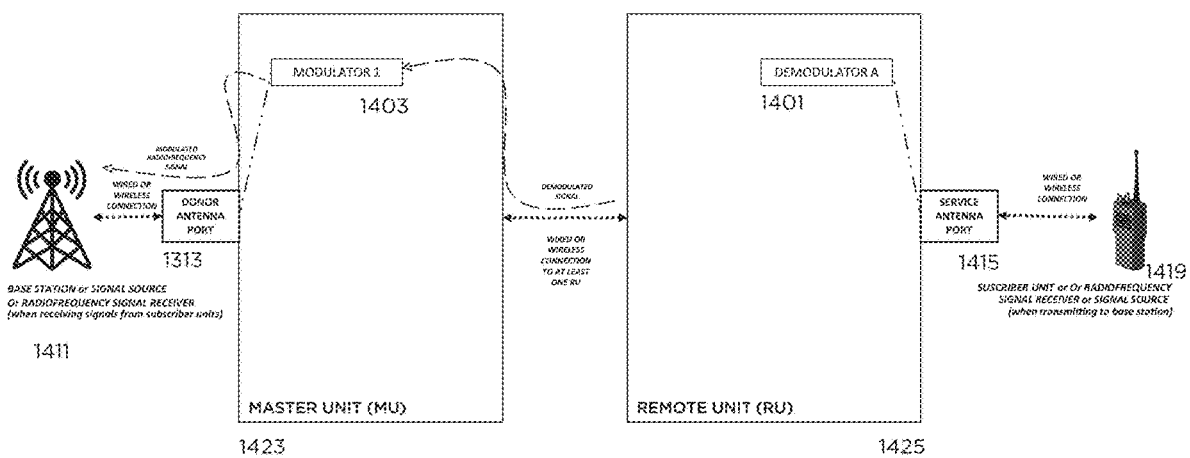
FIG. 14 illustrates uplink signal transmission through an embodiment of the master unit of the antenna system of FIG. 2.

FIG. 14 illustrates uplink signal transmission through an embodiment of the master unit of the antenna system of FIG. 2. The baseband signal from demodulator 1401 is modulated by modulator 1403 and passed on to donor antenna port 1413 for transmission to the base station 1411. The modulation/demodulation configurations and/or functionality applicable to FIGS. 11-14 have been explained above.

Figure 15:
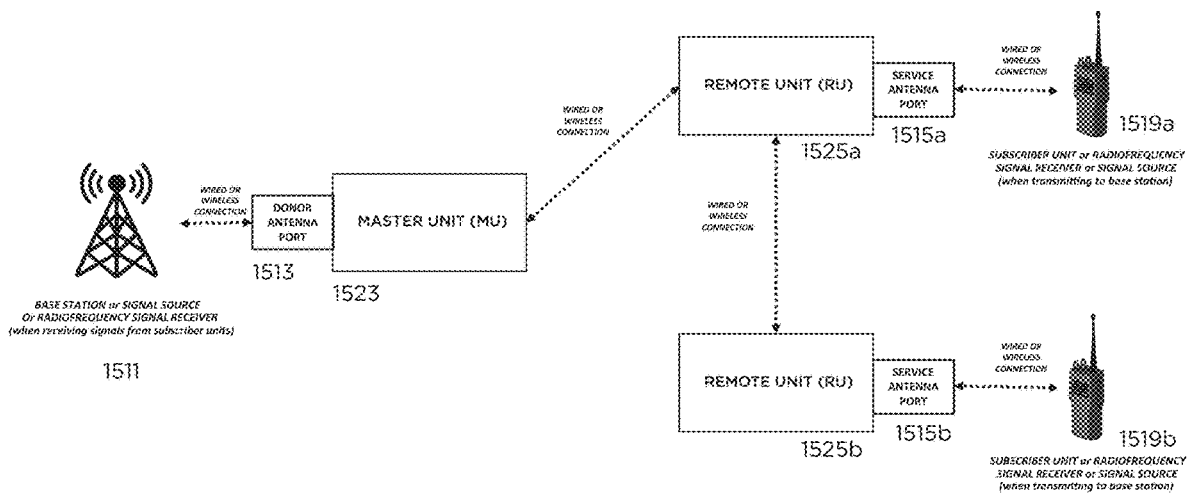
FIG. 15 illustrates an embodiment of an antenna system using a master unit and multiple remote units communicating with one another.

FIG. 15 illustrates an embodiment of an antenna system using a master unit 1523 and multiple remote units 1525a and 1525b communicating with one another.

Figure 16:
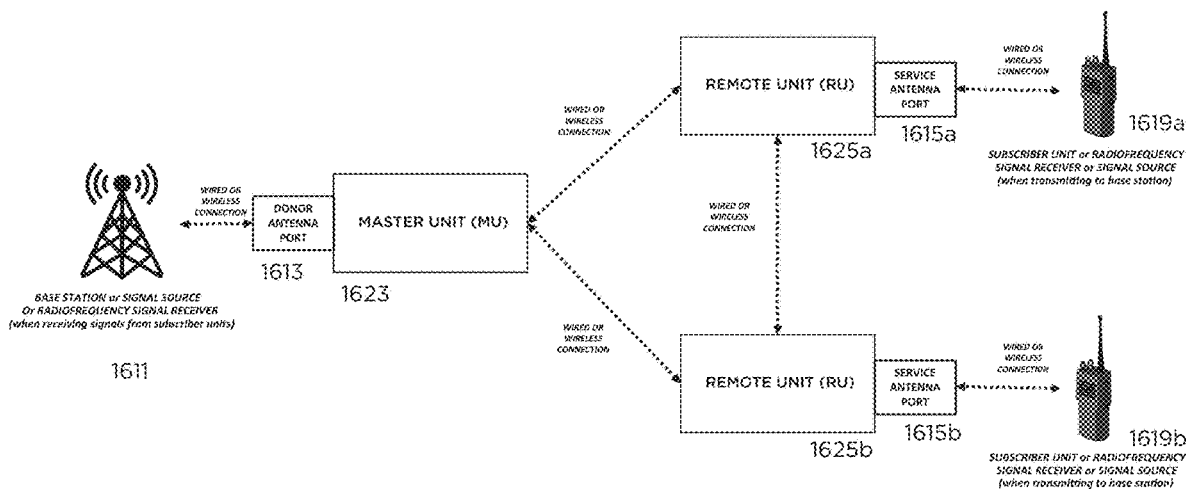
FIG. 16 illustrates an embodiment of an antenna system using a master unit and multiple remote units communicating with the master unit.

FIG. 16 illustrates an embodiment of an antenna system using a master unit 1623 and multiple remote units 1625a and 1625b communicating with each other and with the master unit 1623.

Figure 17:
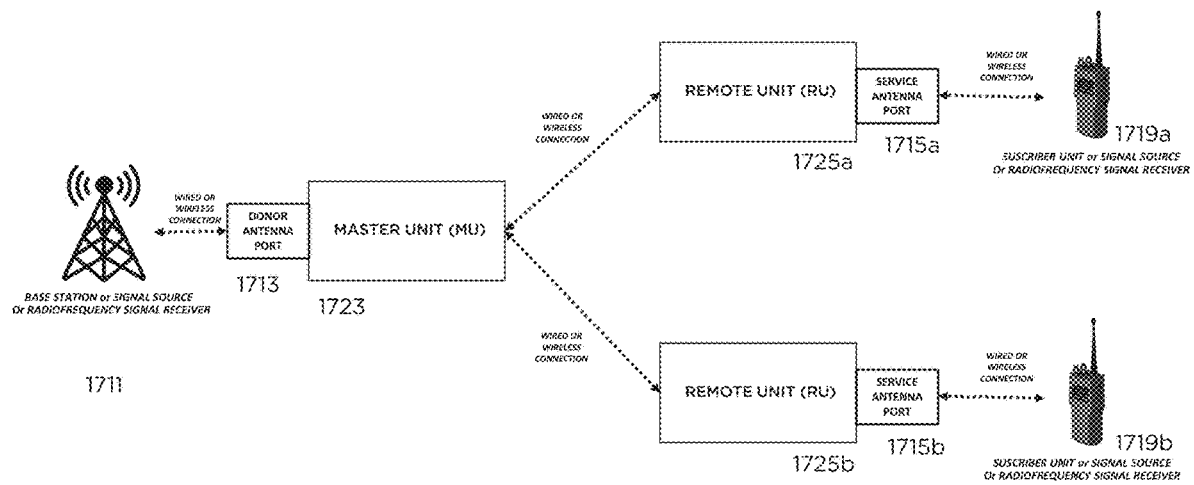
FIG. 17 illustrates an embodiment of an antenna system using a master unit and multiple remote units communicating with the master unit.

Multiple MUs and RUs are contemplated within the disclosure. For example, a system in accordance with the disclosure may utilize a "daisy chain" configuration, whereby a first remote unit is connected directly with a master unit, and a second remote unit is connected to the first remote unit (FIG. 15). Another embodiment may utilize a "double daisy chain" configuration, whereby the second remote unit is also directly connected with the master unit (FIG. 16). In yet another embodiment, a star configuration may also be implemented (see FIG. 17)

Figure 18:
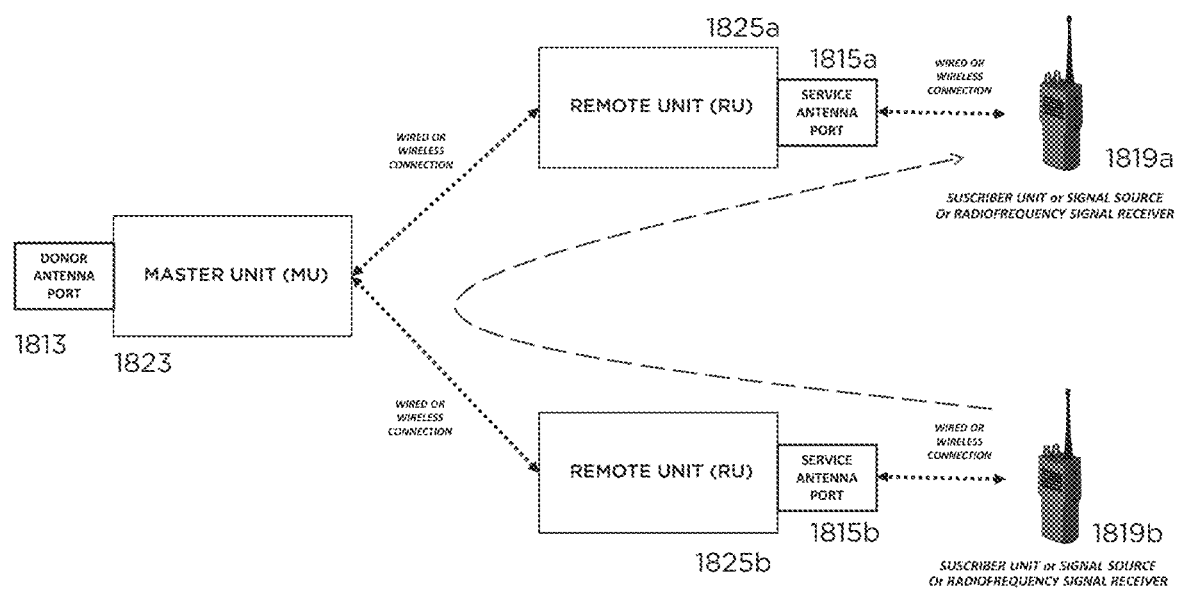
FIG. 18 illustrates an embodiment of an distributed antenna system with direct terminal unit to terminal unit communication without being retransmitted by a base station in accordance with one embodiment.

An additional application in DAS systems is to support direct terminal unit to terminal unit communication without going through or having to rely on a base station. In FIG. 18, Terminal Unit 1 (bottom, numeral 1819b) transmits a signal on Frequency X with modulation scheme A to Remote Unit R1 (bottom, numeral 1825b), and is relayed or retransmitted via the MU 1823 of the DAS to Remote Unit R2 (top, numeral 1825a), and further relayed or retransmitted by Remote Unit R2 to Terminal Unit 2 (top, numeral 1819a). The signal transmitted by Remote Unit R2 can have the same frequency or a different frequency than the signal received by Remote Unit R1 and can have the same or a different modulation scheme.

Figure 19:
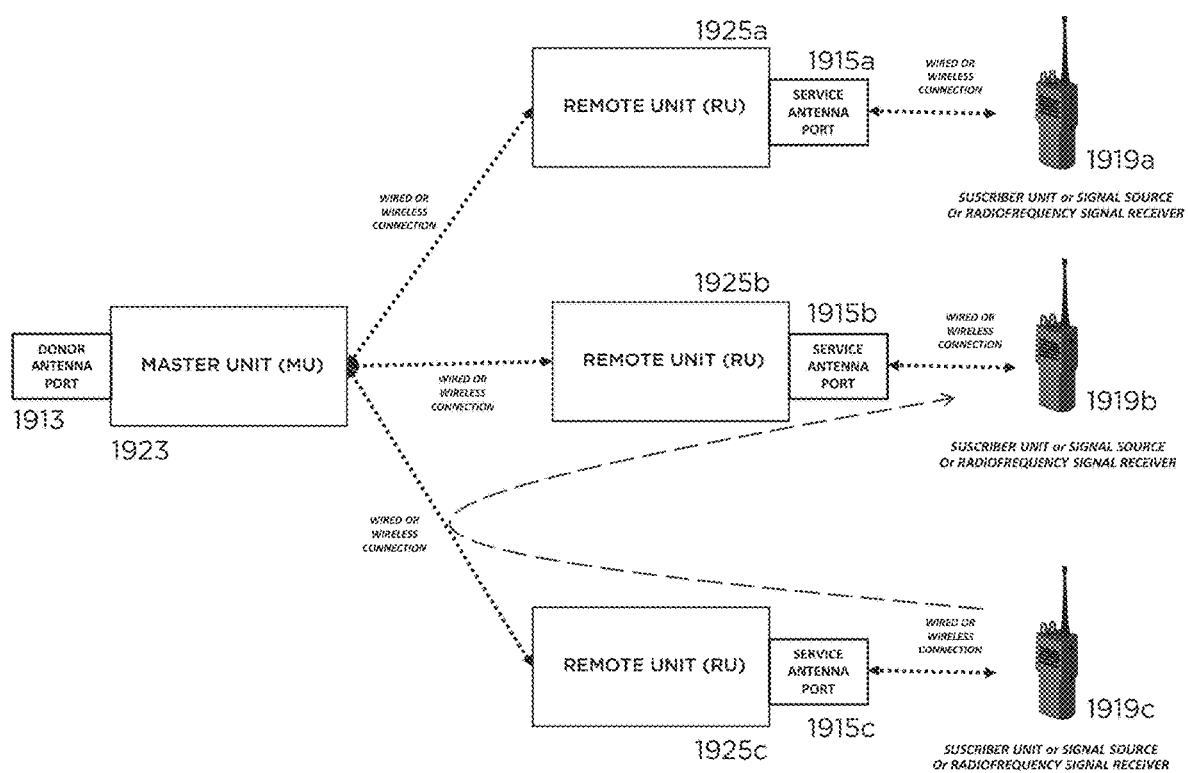
FIG. 19 illustrates an embodiment of an distributed antenna system with direct terminal unit to terminal unit communication without being retransmitted by a base station in accordance with one embodiment.

FIG. 19 shows an implementation where the DAS is used to establish communication with more than two Remote Units, and either the system operator (not shown) and/or the Master Unit micro controller (not shown) and/or a Remote Unit's micro controller (not shown) decides which Remote Units will receive the signal through the DAS, with such selected Remote Unit(s) transmitting the signal to the respective Terminal Units that lie or move within the coverage area for the selected Remote Unit(s). The system operator (not shown) and/or the Master Unit micro controller (not shown) and/or a Remote Unit's micro controller (not shown) also decides if the Master Unit will transmit the signal to the appropriate Terminal Units. The signal transmitted by the transmitting Remote Unit can have the same center frequency or a different center frequency than the signal received by receiver Remote Unit and can have the same or a different modulation scheme.

Figure 20:
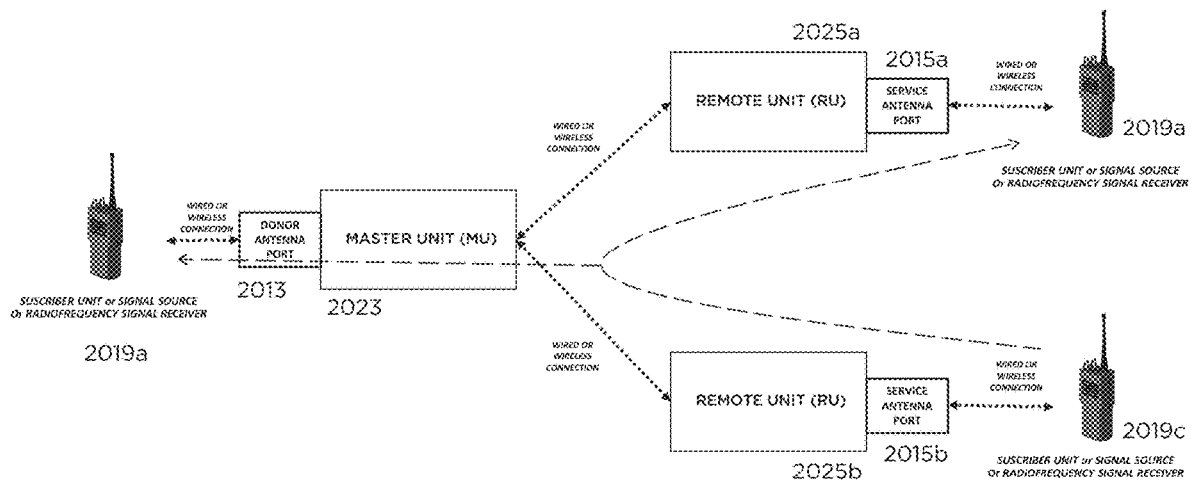
FIG. 20 illustrates an embodiment of an distributed antenna system with direct terminal unit to terminal unit communication without being retransmitted by a base station in accordance with one embodiment.
Figure 21:
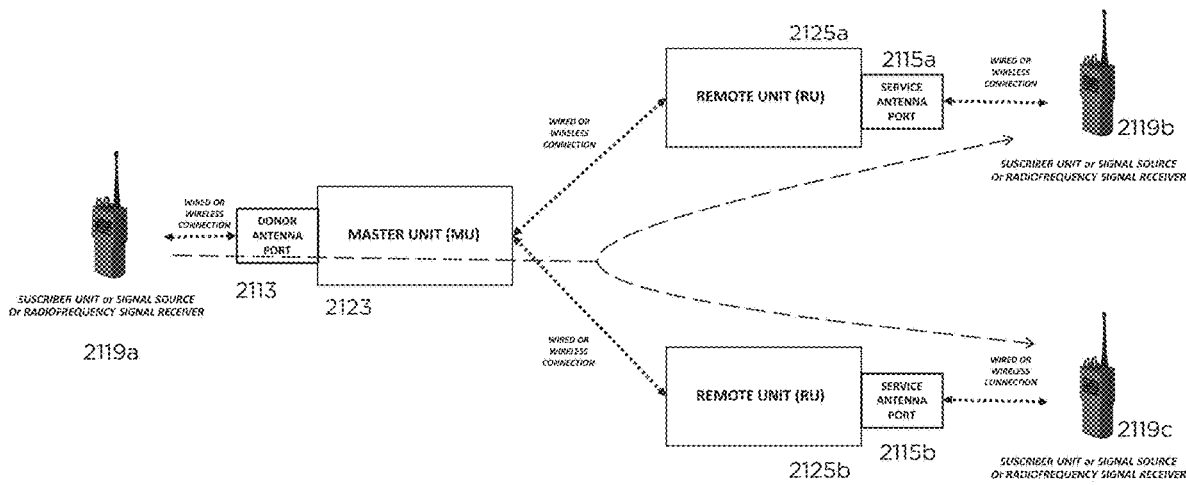
FIG. 21 illustrates an embodiment of an distributed antenna system with direct terminal unit to terminal unit communication without being retransmitted by a base station in accordance with one embodiment.

FIG. 20 illustrates a scenario similar to the implementation illustrated in FIG. 18, but in the implementation illustrated in FIG. 20 the signal is being transmitted by the Master Unit 2023 to Terminal Units (2019a-c) that are wired to or wirelessly connected with the Master Unit 2023. The signal transmitted by the transmitting Remote Unit and the MU can have the same center frequency as or a different center frequency from the signal received by receiver Remote Unit and can have the same or a different modulation scheme. FIG. 21 illustrates a scenario similar to the implementation illustrated in FIG. 20, but in the implementation illustrated in FIG. 21 the Terminal Unit M (left, numeral 2119a) transmits the signal on Frequency X with Modulation Scheme A, which is received by Master Unit 2123. The signal is then sent via the DAS to Remote Unit R1 (bottom right, numeral 2125b) and transmitted by Remote Unit R1 to Terminal Unit 1 (bottom right, numeral 2119c). The signal is also sent via the DAS to Remote Unit R2 (top right, numeral 2125a) and transmitted by Remote Unit R2 to Terminal Unit 2 (top right, numeral 2119b). The signal transmitted by the transmitting Remote Units can have the same center frequency or different center frequency than the signal received by Master Unit and can have the same or a different modulation scheme.

The system operator (not shown) and/or the Master Unit micro controller (not shown) and/or a Remote Unit's micro controller (not shown) decides which Remote Units will receive the signal through the DAS and the selected Remote Unit(s) will transmit the signal to it or their respective Terminal Units that lie or move within the selected Remote Unit(s) corresponding coverage area(s).

Figure 22:
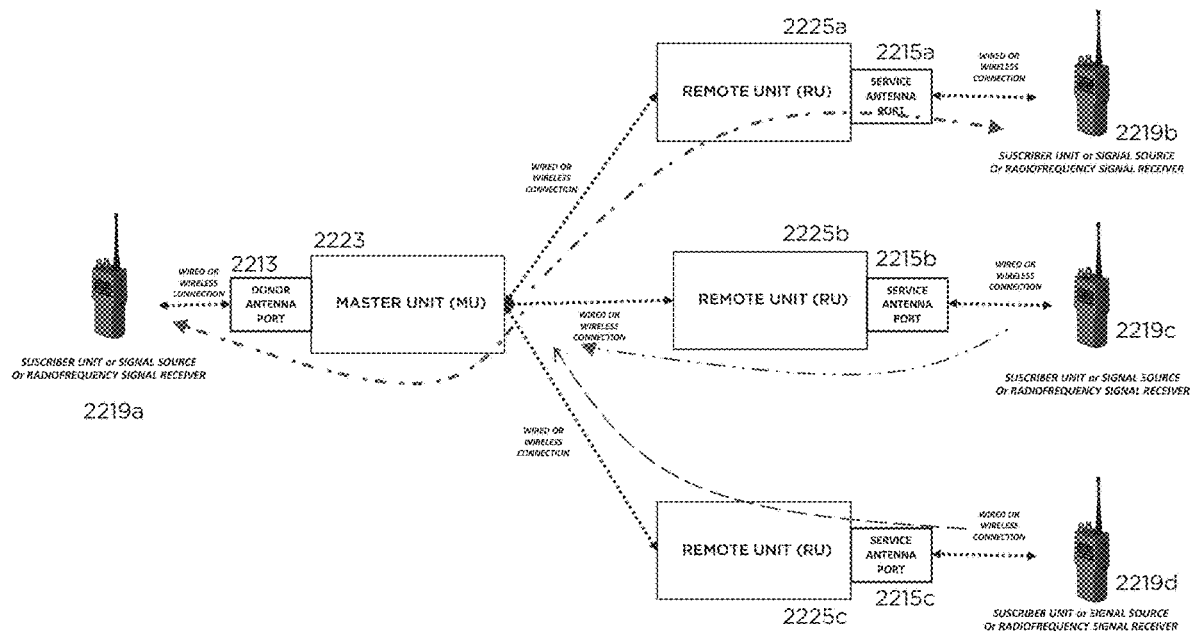
FIG. 22 illustrates an embodiment of an distributed antenna system with direct terminal unit to terminal unit communication without being retransmitted by a base station in accordance with one embodiment.

In FIG. 22 the Terminal Unit 1 (bottom right, numeral 2219d) transmits a signal (illustrated with hidden line pattern "_ _ _", Signal RED) that is received by Remote Unit R1 (bottom right, numeral 2225c). Terminal Unit 2 (middle right, numeral 2219c) transmits a signal (illustrated with phantom line pattern "_.._", Signal Blue) that is received by Remote Unit R2 (middle right, numeral 2225b). The system operator (not shown) and/or the Master Unit micro controller (not shown) and/or a Remote Unit's micro controller (not shown) decides if Signal RED or Signal BLUE, or both, will be sent through the DAS to any third Remote Unit 2225a and/or Master Unit 2223 for transmission to another Terminal Unit 2219a (illustrated with projected line pattern "_._", Signal GREEN), with the selected signal(s) being transmitted to other terminal units associated to each unit transmitting Signal GREEN. Signal GREEN, transmitted by the selected Remote Units and/or Master Unit can have the same or a different center frequency than the Signal RED and/or Signal BLUE, and can have the same or a different Modulation Schemes. Signal GREEN can be composed by both Signals RED and BLUE, or can be any one of these.

Figure 23:
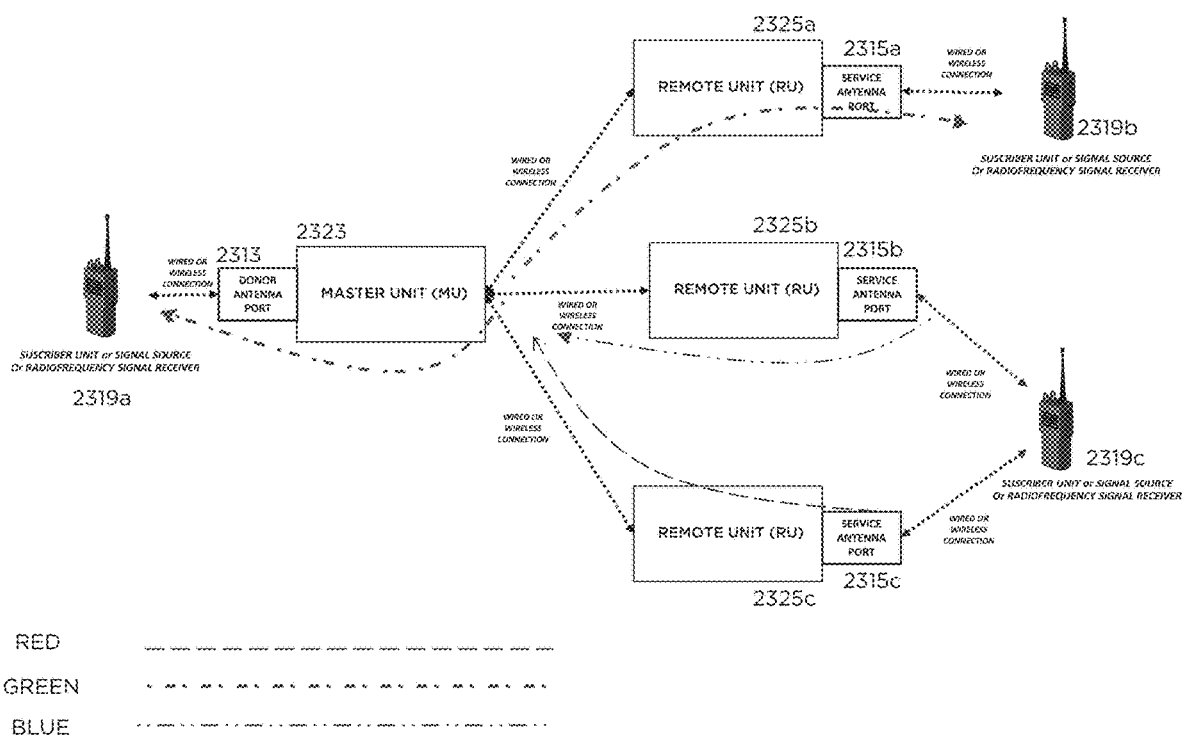
FIG. 23 illustrates an embodiment of an distributed antenna system with direct terminal unit to terminal unit communication without being retransmitted by a base station in accordance with one embodiment.

In FIG. 23 Terminal Unit 1 (bottom right, numeral 2319c) transmits a signal that is received simultaneously by Remote Unit R1 (bottom right, numeral 2325c) as Signal RED (hidden line pattern), and by Remote Unit R2 (middle right, numeral 2325b) as Signal BLUE (phantom line pattern). The system operator (not shown) and/or the Master Unit micro controller (not shown) and/or a Remote Unit's micro controller (not shown) decides if Signal RED or Signal BLUE will be sent through the DAS to any third Remote Unit 2319b and/or Master Unit 2323 for transmission to another Terminal Unit 2319a as Signal GREEN (projected line pattern). Signal GREEN may be transmitted to Terminal Units by one or more Remote Units other than R1 or R2 and/or by Master Unit. Signal GREEN can have the same or a different frequency (center) than the Signal RED and BLUE and can have the same or a different Modulation Scheme.

Figure 24:
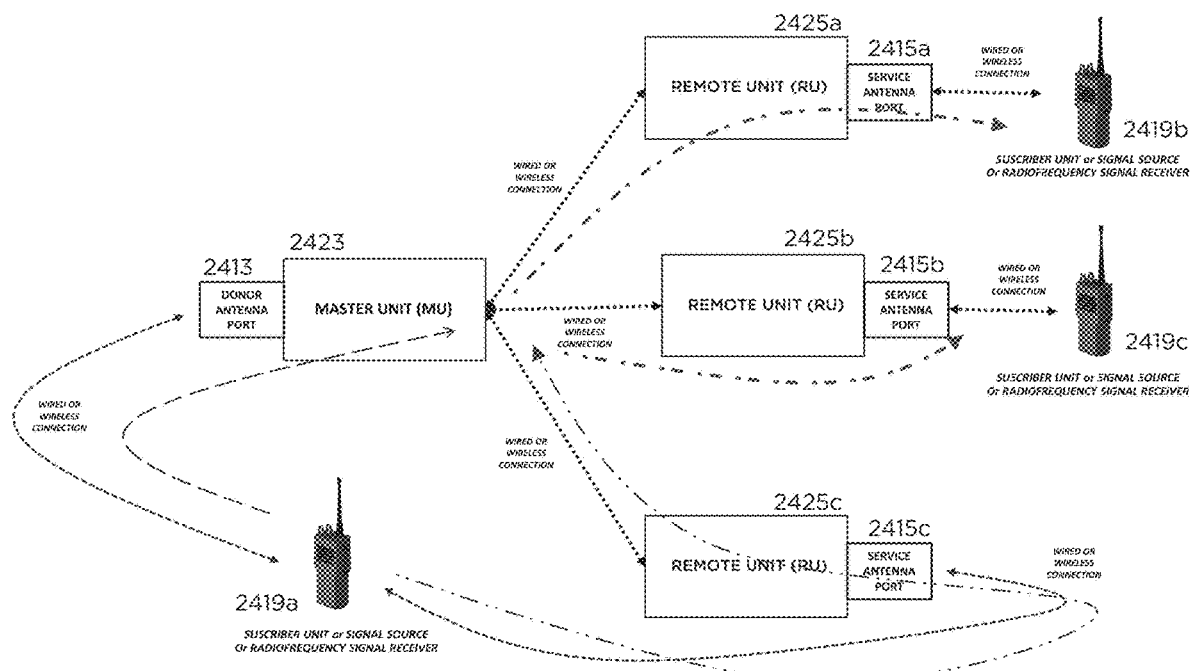
FIG. 24 illustrates an embodiment of an distributed antenna system with direct terminal unit to terminal unit communication without being retransmitted by a base station in accordance with one embodiment.

In FIG. 24 Terminal Unit 1 (bottom, numeral 2419a) transmits a signal that is received simultaneously by Remote Unit R1 (bottom right, numeral 2425c) as Signal BLUE (phantom line pattern), and by Master Unit 2423 as Signal RED (hidden line pattern). The system operator (not shown) and/or the Master Unit micro controller (not shown) and/or a Remote Unit's micro controller (not shown) decides if Signal RED or Signal BLUE will be sent through the DAS to any third Remote Unit and/or Master Unit as Signal GREEN (projected line pattern). Signal GREEN may be transmitted to Terminal Units by one or more Remote Units other than R1 and/or by Master Unit. Signal GREEN can have the same or a different frequency (center) than the Signal RED and BLUE and can have the same or a different Modulation Scheme.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

Further, the limitations of the following claims are not written in means—plus-function format and are not intended to be interpreted based on 35 U.S.C. 112(f), unless and until such claim limitations expressly use the phrase "means for" followed by a statement of function void of further structure.

I claim:

1. An antenna extension coverage system comprising:
   a signal booster for processing a first signal received from a base station and transmitting said processed first signal to terminal equipment in a downlink direction, and for processing a second signal received from said terminal equipment and transmitting said processed second signal to said base station in an uplink direction; wherein the signal booster comprises
   a first demodulator to demodulate the first signal received from the base station,
   a first modulator for modulating the demodulated first signal before transmitting the modulated first signal to the terminal equipment in the downlink direction,
   a second demodulator to demodulate the second signal received from the terminal equipment, and
   a second modulator for modulating the demodulated second signal before transmitting the modulated second signal to the base station in the uplink direction;

wherein the system is able to ascertain a modulation scheme and a center frequency of signals received by said demodulators on a per channel basis by applying an automatic modulation classifier function.

2. The system of claim 1, wherein the first modulator outputs the modulated first signal with a center frequency that is the same as or different than a center frequency of the first signal received by the signal booster from the base station in the downlink direction.

3. The system of claim 1, wherein the signal booster further comprises
a third demodulator to demodulate a third signal received from the base station,
a third modulator for modulating the demodulated third signal before transmitting the modulated third signal to the terminal equipment in the downlink direction,
a fourth demodulator to demodulate a fourth signal received from the terminal equipment, and
a fourth modulator for modulating the demodulated fourth signal before transmitting the modulated fourth signal to the base station in the uplink direction.

4. The system of claim 3, wherein the signal booster further comprises a microcontroller electrically coupled to and controlling the operation of said modulators and demodulators.

5. The system of claim 4, wherein the microcontroller ascertains a modulation scheme and a center frequency of signals received by said demodulators on a per channel basis by relying on information provided by a system operator.

6. The system of claim 4, wherein the microcontroller ascertains a modulation scheme and a center frequency of signals received by said demodulators on a per channel basis by applying an automatic modulation classifier function.

7. The system of claim 4, wherein the microcontroller ascertains a modulation scheme and a center frequency of signals received by said demodulators on a per channel basis by relying on information provided by said base station.

8. The system of claim 4, wherein the microcontroller receives instructions from a system operator that include an indication of the channel in which each of said demodulators and modulators are required to tune in, an indication of which modulation scheme is to be implemented by each said modulators, which demodulation scheme is to be implemented by each said demodulators, and instructions for implementing a demodulator to the modulator routing scheme.

9. An antenna extension coverage system comprising:
a distributed antenna system comprising a master unit in communication with a remote unit, the distributed antenna system
processing a first signal received from a base station and transmitting said processed first signal to terminal equipment in a downlink direction, and
processing a second signal received from said terminal equipment and transmitting said processed second signal to said base station in an uplink direction;
wherein the distributed antenna system comprises
a first demodulator to demodulate the first signal received from the base station,
a first modulator for modulating the demodulated first signal before transmitting the modulated first signal to the terminal equipment in the downlink direction,
a second demodulator to demodulate the second signal received from the terminal equipment, and
a second modulator for modulating the demodulated second signal before transmitting the modulated second signal to the base station in the uplink direction;
wherein the system is able to ascertain a modulation scheme and a center frequency of signals received by said demodulators on a per channel basis by applying an automatic modulation classifier function.

10. The antenna extension coverage system of claim 9, wherein the first modulator outputs the modulated first signal with a center frequency that is the same as or different than a center frequency of the first signal received by the distributed antenna system from the base station in the downlink direction.

11. The antenna extension coverage system of claim 9, wherein the distributed antenna system further comprises
a third demodulator to demodulate a third signal received from the base station,
a third modulator for modulating the demodulated third signal before transmitting the modulated third signal to the terminal equipment in the downlink direction,
a fourth demodulator to demodulate a fourth signal received from the terminal equipment, and
a fourth modulator for modulating the demodulated fourth signal before transmitting the modulated fourth signal to the base station in the uplink direction.

12. The antenna extension coverage system of claim 11, wherein the distributed antenna system further comprises a microcontroller electrically coupled to and controlling the operation of said modulators and demodulators.

13. The antenna extension coverage system of claim 12, wherein the microcontroller ascertains a modulation scheme and a center frequency of signals received by said demodulators on a per channel basis by relying on information provided by a system operator.

14. The antenna extension coverage system of claim 12, wherein the microcontroller ascertains a modulation scheme and a center frequency of signals received by said demodulators on a per channel basis by applying an automatic modulation classifier function.

15. The antenna extension coverage system of claim 12, wherein the microcontroller ascertains a modulation scheme and a center frequency of signals received by said demodulators on a per channel basis by relying on information provided by said base station.

16. The antenna extension coverage system of claim 12, wherein the microcontroller receives instructions from a system operator that include an indication of the channel in which each of said demodulators and modulators are required to tune in, an indication of which modulation scheme is to be implemented by each said modulators, which demodulation scheme is to be implemented by each said demodulators, and instructions for implementing a demodulator to the modulator routing scheme.

* * * * *